Patented Oct. 21, 1941

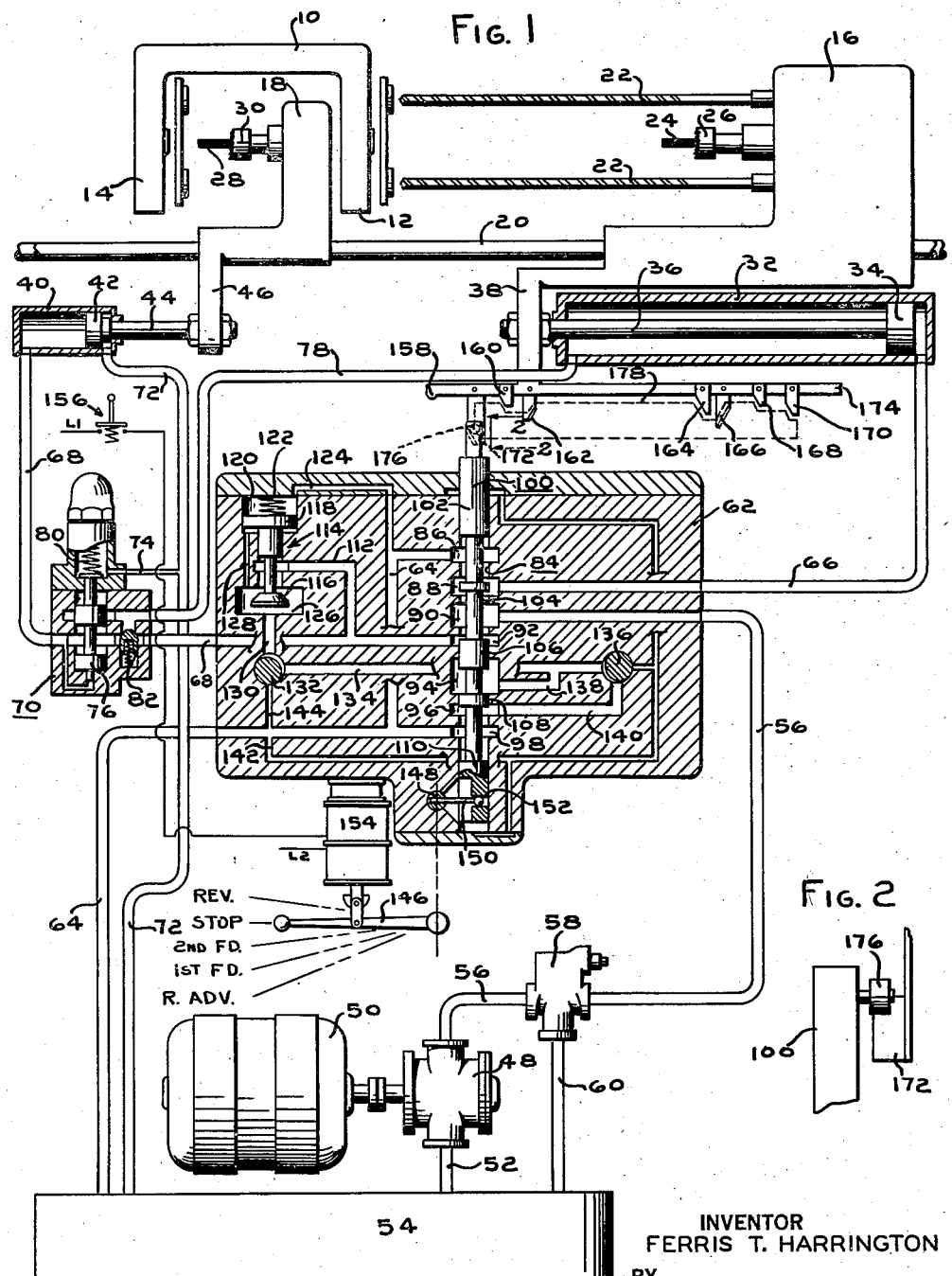

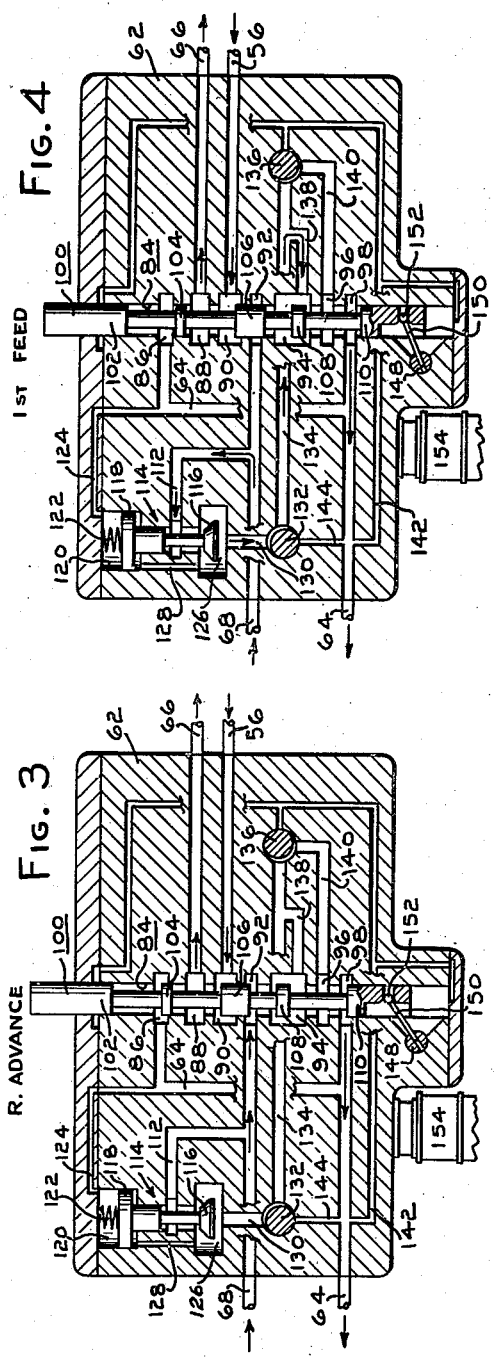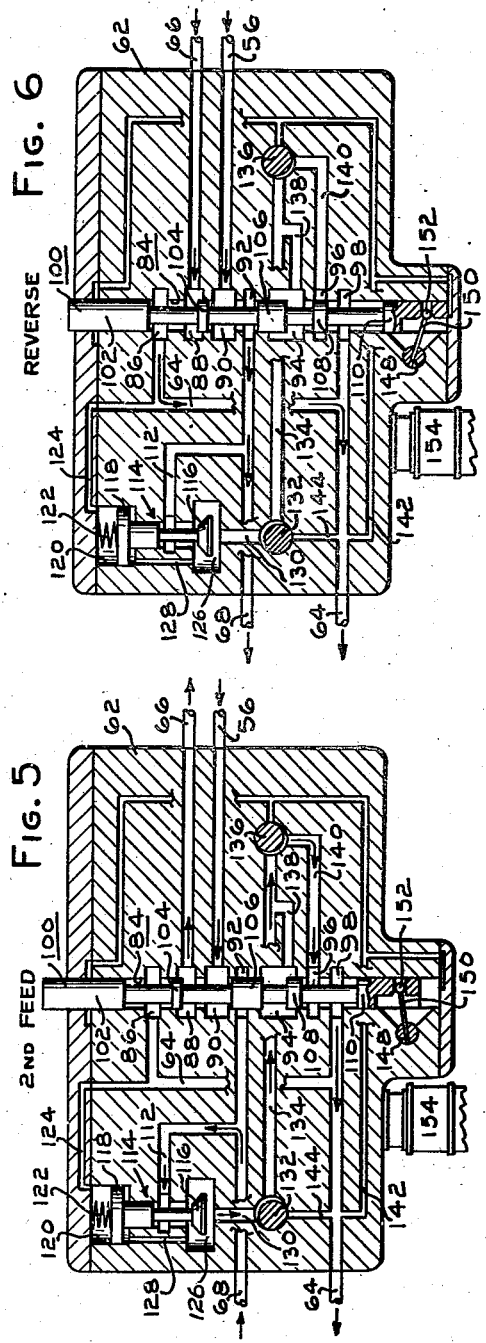

2,259,636

UNITED STATES PATENT OFFICE 2,259,636

POWER TRANSMISSION

Ferris T. Harrington, Detroit, Mich., assignor to Vickers Incorporated, Detroit, Mich., a corporation of Michigan Application May 24, 1939, Serial No. 275,330

2 Claims. (Cl. 121—45)

This invention relates to power transmissions, particularly to those of the type comprising two or more fluid pressure energy translating devices one of which may function as a pump and another as a fluid motor.

The present invention is particularly concerned with a power transmission system adapted for driving one or more reciprocating carriages of a machine tool of the class such as boring, drilling, milling, turning, or grinding or other machines where it is desired to advance the carriage at a plurality of rates of travel for rapid advance and feeding of a tool relative to a work-piece or vice versa. In most applications of hydraulic drives to machine tool carriages it is usually sufficient to provide a single rapid advance rate of travel and two feed rates, that is, a coarse feed and a fine feed. While there are available many types of control systems for providing such rates, it occasionally is necessary, however, in machines for operating on unusual shaped pieces to provide more than two feed rates.

Since control apparatus for providing two feed rates is readily available in more or less standard form and since the necessity for more than two feed rates arises infrequently, it is an object of the present invention to provide a power transmission system wherein a standard control system may be utilized for providing double the number of feed rates of which it is normally capable.

Further objects and advantages of the present invention will be apparent from the following description, reference being had to the accompanying drawings wherein a preferred form of the present invention is clearly shown.

In the drawings:

Figure 1 is a diagrammatic view of a hydraulic power transmission system embodying a preferred form of the present invention.

Figure 2 is a detail cross section on line 2—2 of Figure 1.

Figures 3, 4, 5 and 6 are diagrammatic views showing the main control unit of Figure 1 with the parts in different adjusted positions.

The embodiment of the invention selected for illustration is one where the invention is applied to a drilling machine adapted to perform a plurality of drilling, reaming, and facing operations upon two walls of a box-shaped workpiece which is of such shape that one wall would interfere with operations on the other wall from a single drilling head. Such a workpiece is indicated at 10 wherein it is desired to perform certain drilling operations on the wall section 12 from the right-hand side thereof and also to perform other drilling operations on the opposite wall 14 also from the right-hand side thereof.

In order to perform all the drilling operations in a single advancing stroke, a pair of drill heads 16 and 18 are mounted on suitable ways 20 for reciprocating motion toward the workpiece 10. The head 16 may carry tools such as drills 22 for drilling holes in both walls 12 and 14 and a combined reamer 24 and spot facer 26 for reaming and spot facing another hole in the wall 12. The head 18 may carry a reamer 28 and spot facer 30 for finishing a hole in the wall 14. The heads 16 and 18 and their respective tools may be of conventional form and provided with the usual power means (not shown) for rotating the various tool-carrying spindles incorporated therein.

A fluid motor comprising a cylinder 32 has a piston 34, the rod 36 of which is secured to a depending bracket 38 carried by the head 16 in the usual manner. A second fluid motor comprising a cylinder 40 has its piston 42 connected by the rod 44 with the depending bracket 46 on the head 18. The two motors are in axial alignment and so spaced that when the head 16 has advanced to the left a predetermined amount the rod 36 will abut the rod 44 and thereafter the two heads will continue to advance to the left in unison.

For the purpose of supplying fluid to the cylinders 32 and 40 there is provided a hydraulic circuit comprising a pump 48 driven by a suitable prime mover, such as an electric motor 50. The pump 48 has a suction conduit 52 through which fluid is withdrawn from the usual tank 54. A delivery conduit 56 leads from the pump through a conventional relief valve 58 which serves to bypass the pump delivery to tank through a conduit 60 whenever a predetermined pressure is exceeded in the conduit 56.

The conduit 56 extends to a unitary control panel 62 which may be of any suitable type usually utilized for controlling the flow of fluid to a single hydraulic motor. The particular form of control panel 62 is well known and per se forms no part of the present invention. The panel is connected with tank by a conduit 64 and with the head end of cylinder 32 by a conduit 66.

A conduit 68 extends from panel 62 through a combined sequence and check valve 70 to the head end of cylinder 40. The rod end of cylinder 40 is connected with tank through a conduit 72 having a branch 74 serving as the seepage drain for valve 70. The valve 70 has a pressure responsive spool 76 adapted to normally cut off the conduit 68 from a branch conduit 78 which leads to the rod end of cylinder 32. Whenever pressure in conduit 68 reaches a predetermined point which may be adjusted by varying the setting of the spring 80, the spool 76 lifts placing conduits 68 and 78 in free communication. A check valve 82 permits free flow from conduit 78 to conduit 68.

The panel 62 is provided with a main valve bore 84 having a plurality of ports 86, 88, 90, 92, 94, 96, and 98 formed along its length as illustrated. Mounted in the bore 84 is a spool 100 provided with lands 102, 104, 106, 108, and 110 for establishing various connections between the various ports depending upon the spool position. Conduit 56 connects with the port 90 which constitutes the pressure port of the panel. Conduit 66 connects with port 88 while the tank conduit 64 connects with ports 86 and 98. Conduit 68 connects with port 92 and also by a branch 112 with a hydrostatic valve 114. The latter has a poppet head 116 the position of which is under the control of a piston 118 slidable in a cylinder 120 and biased downwardly by a light spring 122. The upper face of the piston is subject to tank pressure transmitted from conduit 64 through a branch conduit 124. The lower face of the piston is subject to the pressure in a chamber 126 constituting the outlet of the valve, which pressure is transmitted through a restricted passage 128.

The chamber 126 connects by a conduit 130 with an adjustable orifice 132. From the orifice 132 a conduit 134 extends to a second adjustable orifice 136, a branch 138 communicating with the port 94 of bore 84. From the orifice 136 a conduit 140 extends to the port 96. Seepage drain conduits 142 and 144 connect the ends of bore 84 and the drain chambers of orifices 132 and 136 with the tank line 64.

The valve spool 100 is controlled from three different sources. One is a manual lever 146 pivoted at 148 and having a ball-ended extension 150 slidably mounted in a transverse bore 152 at the bottom end of spool 100. The second source of control is constituted by a solenoid 154 connected to the lever 146 and adapted to lift the same to its uppermost position when energized by depression of a limit switch 156. The latter is adapted to be closed by a cam 158 carried by the head 16 when the latter reaches the left-hand limit of its stroke. The third source of control of spool 100 is provided by a plurality of cams 160, 162, 164, 166, 168, 170, and 172 also carried by the head 16. For the purpose of simplicity in illustration the cams are shown as adjustably mounted on a longitudinally extending bar 174 secured to the bracket 38 and are shown in a somewhat distorted scale as regards the angle thereof.

The cams 160 to 172 are adapted to engage a roller 176 (see Figure 2) mounted on the upper end of the spool 100 and to move the latter to various positions of up and down adjustment as the cams pass the roller 176 in sequence. The various positions of the roller are illustrated along a dotted line 178 which carries the roller through a complete cycle of travel.

It will be noted that cams 160, 164, 168 and 170 are adapted to depress the roller 176 downwardly as they pass the same in the leftward travel of the head 16 while cams 162 and 166 are hook cams adapted to lift the roller as they pass to the left thereof. Cam 172 is also a hook cam adapted to lift the roller 176 as it passes the roller just previous to the end of the stroke of head 16 end to the right.

In operation with the motor 50 running, pump 48 withdraws oil from the tank 54 delivering it to conduit 56. With the valve in the stop position illustrated in Figure 1 the entire pump delivery is by-passed to tank through ports 90, 88 and 86 and conduit 64. In order to start the machine in operation the valve spool 100 is raised to its uppermost position by depressing the operating lever 146 manually. This constitutes the position of rapid advance and is illustrated in Figure 3. In this position land 104 blocks communication between ports 86 and 88. Land 106 has its upper edge below the top of port 90 and its lower edge in the middle of port 92, thus directing the flow from conduit 56 to conduit 66 and the head end of cylinder 32. Land 108 is raised sufficiently to lie fully within port 94, thus permitting return flow from the rod end of cylinder 32 to take place through conduit 78, check valve 82, conduit 68, ports 92, 94, 96, and 98 and conduit 64 to tank. Since this path is unrestricted, the head 16 will advance to the left at a rate determined by the delivery capacity of pump 48, thus advancing the drills 22 rapidly up to a point just short of engagement with the workpiece 10.

At this point cam 160 contacts roller 176 depressing spool 100 downwardly one step into the position designated first or coarse feed. In this position of the spool 100, illustrated in Figure 4, land 104 remains between ports 86 and 88 thus continuing the flow to the head end of the cylinder. Land 106 drops sufficiently, however, so that its lower edge comes below port 92, thus blocking the return flow from conduit 68 into port 94. Flow from port 90 to port 92 is also still blocked by land 106. Land 108 is not lowered sufficiently, however, to block port 94 from port 96. Return flow under these conditions takes place from conduit 68 through branch conduit 112, hydrostatic valve 114, chamber 126, conduit 130, throttle 132, conduits 134 and 138, ports 94, 96, and 98 and conduit 64 to tank. Under these conditions the flow out of the rod end of cylinder 32 is metered by the orifice 132 and hydrostatic valve 114, the excess delivery of the pump over what is required at the head end of cylinder 32 blowing over the relief valve 58.

Inasmuch as the opposite sides of piston 118 are connected with opposite sides of the throttle 132, the valve 114 acts to maintain a constant pressure differential across the throttle thus maintaining a constant rate of flow therethrough independently of load variations on the piston 34.

The travel of the head 16 continues until the drills 22 have passed through the wall 12 whereupon the hook cam 162 engages the roller 176 lifting the spool 100 into its rapid advance position again. This causes the head 16 to advance rapidly until a point is reached where the drills 22 are about to engage the wall 14 at which point cam 164 engages roller 176 depressing the same downwardly two steps to the second feed position.

In this position which is illustrated in Figure 5 land 104 still blocks communication between ports 86 and 88. Land 106 also still blocks flow from port 90 to port 92 and from port 92 to port 94. Land 108 has moved down, however, sufficiently to block port 94 from port 96. The return path under these conditions is the same as before except that instead of entering conduit 138 the return fluid is now forced to pass through throttle 136, conduit 140, and port 96 in order to reach the port 98. Inasmuch as the throttle 136 is normally adjusted to a much smaller opening than is the throttle 132, the rate of flow is thus determined predominantly by the throttle 136 to meter the return fluid at a much slower rate. The hydrostatic valve 114 continues to maintain a constant pressure drop across orifice 136 thus insuring a fixed rate of flow therethrough.

After the drills 22 have passed through the wall 14, hook cam 166 engages a roller 176, again lifting spool 100 to rapid advance position. The carriage 16 accordingly advances rapidly until a point is reached where the reamer 24 is about to engage the wall 12. During this rapid advance stroke the rod 36 comes into abutment with the rod 44 thus picking up the head 18 and causing it to advance with the head 16. It will be seen that during this movement of the two heads in unison that oil is discharged not only from the rod end of cylinder 32 but also from the head end of the cylinder 40, the combined discharges joining at valve 70 to pass through the conduit 68 and through panel 62. During the rapid advance the return flow path is an unrestricted one and is sufficient to handle this additional flow without substantially decreasing the speed of travel.

At the end of this rapid advance stroke, cam 168 strikes roller 176, again depressing spool 100 to the coarse feed position. The flow conditions through the panel 62 are the same as in the previous coarse feed position. Since, however, the cubic displacement into the conduit 68 per unit of linear travel of the heads 16 and 18 is greater than that which previously existed before the head 18 was picked up, it will be seen that the same rate of flow through conduit 68 will cause a slower speed of linear travel of the heads 16 and 18. The amount of this decrease in speed, of course, depends upon the relative areas of piston 42 and of the rod end of cylinder 32 and may be made in any suitable proportion desired.

The heads accordingly feed to the left together causing the reamers 24 and 28 to perform their work. As the spot facing tools 26 and 30 approach the work, however, cam 170 engages roller 176 depressing spool 100 down one step to the fine feed position. The heads are accordingly caused to feed at a still slower rate permitting the spot facing tools to perform their work.

When this movement is completed, cam 158 engages limit switch 156 which energizes solenoid 154 lifting the lever 146 to its uppermost or reverse position and depressing spool 100 to its lowermost position. In this position, illustrated in Figure 6, land 104 lies between ports 88 and 90 so that pressure fluid from conduit 56 is cut off from line 66. The latter is connected to the tank conduit 64. Land 106 moves downwardly so that its top edge is even with the bottom edge of port 92 thus permitting pressure fluid to flow from conduit 56 through ports 90 and 92 and conduit 68 to the head end of cylinder 40. The sequence valve 70 imposes no resistance to flow through conduit 68, thus permitting full pressure to be exerted on piston 42 which drives the heads 18 and 16 back together. The pressure required to move the heads in this manner is, however, sufficient to raise the spool 76 admitting pressure oil to conduit 78 and the rod end of cylinder 32 at a somewhat reduced pressure but still sufficient to keep the rod end of cylinder 32 filled as the piston 34 travels to the right.

As soon as the piston 42 reaches the limit of its stroke it stalls causing the valve 70 to open wider and causing the entire pump delivery to pass through conduit 78 into the rod end of cylinder 32 returning the same to its right-hand position at a rapid rate. As the end of the stroke is reached, hook cam 172 engages roller 176 lifting the spool 100 to the stop position illustrated in Figure 1.

The device is accordingly brought to rest in the position where it started.

While the form of embodiment of the invention as herein disclosed constitutes a preferred form, it is to be understood that other forms might be adopted, all coming within the scope of the claims which follow.

What is claimed is as follows:

1. In a hydraulic power transmission the combination with means forming a source of pressure fluid, fluid motor means, conduits connecting the motor means to said source for operation thereby, and control means for selectively directing fluid to and from the motor means at a plurality of predetermined rates to advance the motor means at different speeds in one direction, said control means including flow rate controlling means and a valve for selectively rendering the rate controlling means effective to meter the fluid discharged from the motor means at different rates, said motor means including a long stroke piston and cylinder and a short stroke piston and cylinder in abutting relation with the long stroke piston and cylinder during a portion of the long stroke whereby the volume discharged from both pistons and cylinders is effective during said portion of the stroke to cause the motor means to advance at a different rate.

2. In a hydraulic power transmission the combination with means forming a source of pressure fluid, fluid motor means, conduits connecting the motor means to said source for operation thereby, control means for selectively directing fluid to and from the motor means at a plurality of predetermined rates to advance the motor means at different speeds in one direction, said motor means including a long stroke piston and cylinder and a short stroke piston and cylinder in abutting relation with the long stroke piston and cylinder during a portion of the long stroke whereby the volume discharged from both pistons and cylinders is effective during said portion of the stroke to cause the motor means to advance at a different rate, and a pressure responsive valve connected between the short stroke piston and cylinder and the long stroke piston and cylinder to maintain their abutting relation throughout the return travel of the short stroke piston and cylinder.

FERRIS T. HARRINGTON.